United States Patent
Diachina et al.

(10) Patent No.: US 6,577,618 B2
(45) Date of Patent: *Jun. 10, 2003

(54) PACKET CONTROL CHANNEL FEEDBACK SUPPORT FOR CONTENTION AND RESERVATION BASED ACCESS

(75) Inventors: John Diachina, Garner, NC (US); Johan Larsson, Research Triangle Park, NC (US); Alex K. Raith, Durham, NC (US); Jim Ragsdale, Raleigh, NC (US)

(73) Assignee: Telefonaktiebolaget L.M. Ericsson (Publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/796,110

(22) Filed: Feb. 5, 1997

(65) Prior Publication Data

US 2001/0019542 A1 Sep. 6, 2001

Related U.S. Application Data

(63) Continuation-in-part of application No. 08/544,836, filed on Oct. 18, 1995.

(51) Int. Cl.$^7$ .......................... H04B 7/212; H04Q 7/00; H04L 12/413

(52) U.S. Cl. .................. 370/348; 370/329; 370/447; 370/337

(58) Field of Search ............................ 370/322, 342, 370/347, 343, 348, 431, 442, 443, 444, 458, 461, 462, 337, 468, 346, 330, 341, 329, 432, 336, 445, 447, 450, 459

(56) References Cited

U.S. PATENT DOCUMENTS

4,887,265 A 12/1989 Felix
4,899,143 A * 2/1990 Gopinath et al. ........ 340/825.5

(List continued on next page.)

FOREIGN PATENT DOCUMENTS

| EP | 462572 | 12/1991 |
|---|---|---|
| EP | 652680 | 5/1995 |
| JP | 787569 | 3/1995 |
| WO | WO94/10767 | 5/1994 |
| WO | WO97/15165 | 4/1997 |

OTHER PUBLICATIONS

"Cellular System Dual–Mode Mobile Station—Base Station Compatibility Standard", *EIA/TIA Interim Standard, IS–54–B*, pertinent pages only, Apr. 1992.

K. Felix, "Packet Switching in Digital Cellular Systems", *Proc. 38th IEEE Vehicular Technology Conf*, pp. 414–418, Jun. 1988.

(List continued on next page.)

Primary Examiner—Kwang Bin Yao
Assistant Examiner—Hanh Nguyen
(74) Attorney, Agent, or Firm—Coats & Bennett, P.L.L.C.

(57) ABSTRACT

A method is disclosed for improving the efficiency of the packet data channel by interrupting transmissions from or to a first mobile station so as to allow a short message to be communicated between the communication system and a different mobile station. The packet channel feedback information includes several flags: Received/Not Received (R/N); Partial Echo (PE); and Partial Echo Qualifier (PEQ). The PEQ allows the communication system to interrupt the transmission to one mobile station to send a short message to another mobile station. By setting the PEQ to various values, a mobile station can determine whether subchannel ownership has been temporarily interrupted and reassigned to another station.

25 Claims, 10 Drawing Sheets

U.S. PATENT DOCUMENTS

| | | | |
|---|---|---|---|
| 4,916,691 A | | 4/1990 | Goodman |
| 5,175,867 A | | 12/1992 | Wejke et al. |
| 5,307,509 A | * | 4/1994 | Michalon et al. ........... 370/445 |
| 5,353,332 A | | 10/1994 | Raith et al. |
| 5,377,192 A | * | 12/1994 | Goodings et al. ........... 370/348 |
| 5,404,355 A | | 4/1995 | Raith |
| 5,420,864 A | * | 5/1995 | Dahlin et al. ............... 370/347 |
| 5,541,924 A | * | 7/1996 | Tran et al. ................... 370/447 |
| 5,613,163 A | * | 3/1997 | Marron et al. ................. 710/59 |
| 5,619,530 A | * | 4/1997 | Cadd et al. .................. 375/219 |
| 5,701,298 A | * | 12/1997 | Diachina et al. ............ 370/346 |
| 5,729,540 A | * | 3/1998 | Wegrzyn ..................... 370/336 |
| 5,745,695 A | * | 4/1998 | Gilchrist et al. ............. 709/227 |
| 5,752,193 A | * | 5/1998 | Scholefield et al. ......... 455/452 |
| 5,790,551 A | * | 8/1998 | Chan ........................... 370/458 |
| 5,883,887 A | * | 3/1999 | Take et al. ................... 370/329 |
| 5,894,472 A | * | 4/1999 | De Seze ...................... 370/458 |
| 5,910,949 A | * | 6/1999 | Bilstrom et al. ............. 370/337 |
| 6,052,557 A | * | 4/2000 | Kinnunen et al. ........... 370/337 |
| RE37,301 E | * | 7/2001 | Lo ............................... 370/448 |

OTHER PUBLICATIONS

P. Decker et al., "A General Packet Radio Service Proposed for GSM", *GSM in a Future Competitive Environment*, Helsinki, Finland, pp. 1–20, Oct. 13, 1993.

P. Decker, "Packet Radio in GSM", *European Telecommunications Standards Institute (ETSI)*, T Doc SMG 4 58/93, pp. 1–13 (odd pages only), Feb. 12, 1993.

J. Hämäläinen et al., "Packet Data Over GSM Network", T Doc SMG 1 238/93, *ETSI*, pp. 1–8, Sep. 28, 1993.

Q. Guo et al., "*Aggressive Packet Reservation Multiple Access Using Signatures*", International Symposium on Personal Indoor and Mobile Radio Communications (PIMRC'94, vol. 4 (Sep. 18, 1994).

N. Umeda et al., "*Idle–Signal Casting Multiple Access with Partial Echo (ICMA–PE) for Mobile Packet Communications*", Electronics & Communications in Japan, Part I—Communications, vol. 77, No. 4 (Apr. 1, 1994).

International Search Report re PCT/SE98/00137 Date of mailing of search: Nov. 2, 1998.

R. F. Quick et al., "An Overview of the Cellular Digital Packet Data (CDPD) System", *IEEE International Symposium on Personal Indoor and Mobile Radio Communications*, pp. 338–343 (Sep. 8, 1993).

\* cited by examiner

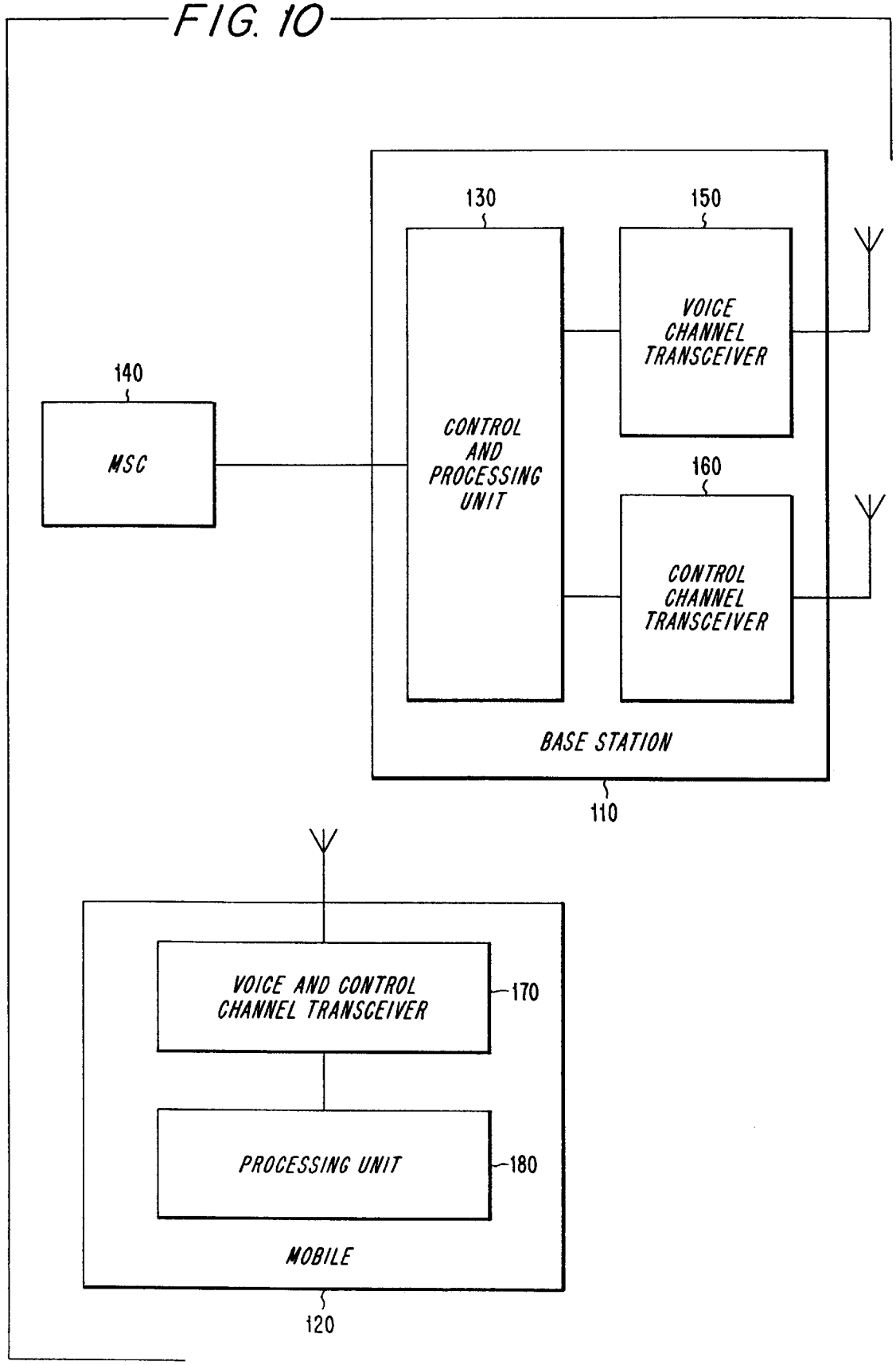

PACKET CONTROL CHANNEL FEEDBACK SUPPORT FOR CONTENTION AND RESERVATION BASED ACCESS

RELATED APPLICATION

This application is a continuation-in-part of U.S. patent application Ser. No. 08/544,836, filed on Oct. 18, 1995 and entitled "Packet Channel Feedback", the disclosure of which is expressly incorporated here by reference.

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time division multiple access (TDMA), code division multiple access (CDMA), and hybrid FDMA/TDMA/CDMA. More specifically, this invention relates to slot formats for transmissions between a communication system and a mobile station on a packet data channel.

FIG. 1(a) shows a general example of a forward (or downlink) digital control channel (DCCH) configured as a succession of time slots 1, 2, . . . , N, . . . included in the consecutive time slots 1, 2, . . . sent on a carrier frequency. These DCCH slots may be defined on a radio channel such as that specified by TIA/EIA/IS-136, and may consist, as seen in FIG. 1(a) for example, of every n-th slot in a series of consecutive slots.

As shown in FIG. 1(a), the DCCH slots are organized into superframes (SF), and each superframe includes a number of logical channels that carry different kinds of information. One or more DCCH slots may be allocated to each logical channel in the superframe. The exemplary downlink superframe in FIG. 1(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 1(a) may be dedicated to other logical channels, e.g., additional paging channels (PCH).

FIG. 1(b) illustrates an exemplary information format for the slots of a forward DCCH. Therein, the number of bits in each field is indicated below that field. The bits sent in the SYNC information are used in a conventional way to help ensure accurate reception of the CSFP and DATA fields. The SYNC information carries a predetermined bit pattern used by the mobile stations to find the start of the slot. The SCF information is used to control a random access channel (RACH), which is used by the mobile stations to request access to the system. The CSFP information conveys a coded superframe phase value that enables the mobile stations to find the start of each superframe.

The systems currently specified by the TIA/EIA/IS-54 and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by, or proposed for, cellular systems are generally based on the circuit-switched mode of operation, using a dedicated radio channel for each active mobile user.

However, the Cellular Digital Packet Data (CDPD) System Specification, Release 1.0 (July 1993), which is expressly incorporated herein by reference, describes a concept for providing packet data services that utilizes available radio channels on current Advanced Mobile Phone Service (AMPS) systems, i.e., the North American analog cellular system. This specification covers functionality topics such as external interfaces, air link interfaces, services, network architecture, network management, and administration.

The specified CDPD system is, to a large extent, based on an infrastructure that is independent of the existing AMPS infrastructure. Commonalities with AMPS systems are essentially limited to utilization of the same type of radio frequency channels and the same base station sites (the base station used by CDPD may be new and CDPD specific) and employment of a signalling interface for coordinating channel assignments between the two systems.

Despite the advent of CDPD, there still exists a need for a system providing general purpose packet data services in digital (e.g., DAMPS, IS-136) cellular systems, based on providing shared packet-data channels optimized for packet data. This application is directed to systems and methods that provide the combined advantages of a connection-oriented network, like that specified by the TIA/EIA/IS-136 standard, and a connectionless, packet data network. Furthermore, the present invention is directed to techniques for accessing a wireless packet data network, for example, using existing connectionless network protocols with low complexity and high throughput.

SUMMARY

According to one embodiment of this invention, a communication system supplies packet control channel feedback information to mobile stations communicating with the system which is responsive, among other things, to bursts of packet data information transmitted by the mobile.

It is an object of one exemplary embodiment of this invention to provide maximum efficiency of the packet data channel by providing means for interrupting transmissions so as to allow for transmissions from other mobile stations that are either attempting to access the system or have already accessed the system and are in the process of sending packet data information. According to the present invention, the packet control channel feedback information includes several flags: Received/Not Received (R/N); Partial Echo (PE); and Partial Echo Qualifier (PEQ). The PEQ allows the communication system to interrupt the transmission from one mobile station to allow for transmissions from another mobile station. By setting the PEQ to various values, the communication system can dynamically allocate ownership of the RACH subchannels and thereby indicate to mobile stations whether or not their subchannel ownership has been temporarily interrupted and reassigned to another mobile station.

In particular, PEQ values have been optimized according to exemplary embodiments to: (1) release the BRI field of the existing IS-136 physical layer for other functionality, (2) allow for a contention-based access scheme (e.g., Slotted ALOHA or CSMA) to operate concurrently with the multiplexing feature (reservation-based access) on the uplink of the same channel, (3) provide for equal application of delay to all packet data users on the same channel independent of loading and (4) quickly detect and recover from subchannel hijacking.

BRIEF DESCRIPTION OF THE DRAWINGS

The features and advantages of Applicants' invention will be understood by reading this description in conjunction with the drawings in which:

FIG. 10 depicts exemplary components of a radiocommunication system which can be used to implement the present invention.

DETAILED DESCRIPTION

Figure 2:
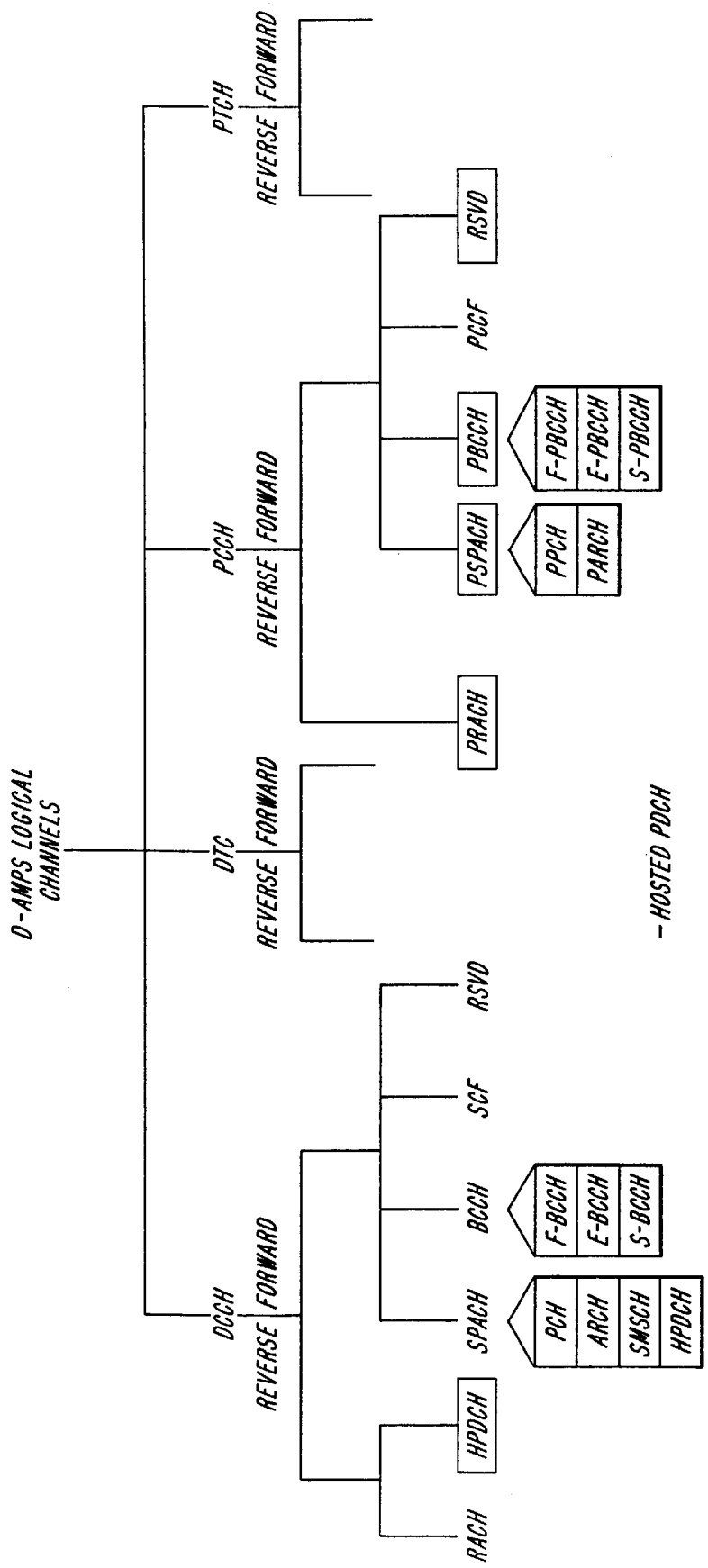
FIG. 2 illustrates logical channels in D-AMPS.

The present invention relates to slot formats for transmissions between a communication system and a mobile station on a packet data channel. To aid in the understanding of the present invention, the structure of the D-AMPS set of logical channels including structures according to the present invention is illustrated in FIG. 2. As illustrated, the digital control channel (DCCH) has a reverse access channel (RACH) in the reverse (uplink) direction and a broadcast control channel (BCCH), a SPACH channel (paging channel, short message service, access response channel), a shared channel feedback (SCF) and a reserved channel (RSVD) in the forward (downlink) direction. The packet control channel (PCCH) has a packet random access channel (PRACH) in the reverse direction and a packet broadcast control channel (PBCCH), a PSPACH channel (packet paging channel PPCH and a packet access response channel PARCH), packet control channel feedback (PCCF) and a reserved channel in the forward direction.

Figure 3:
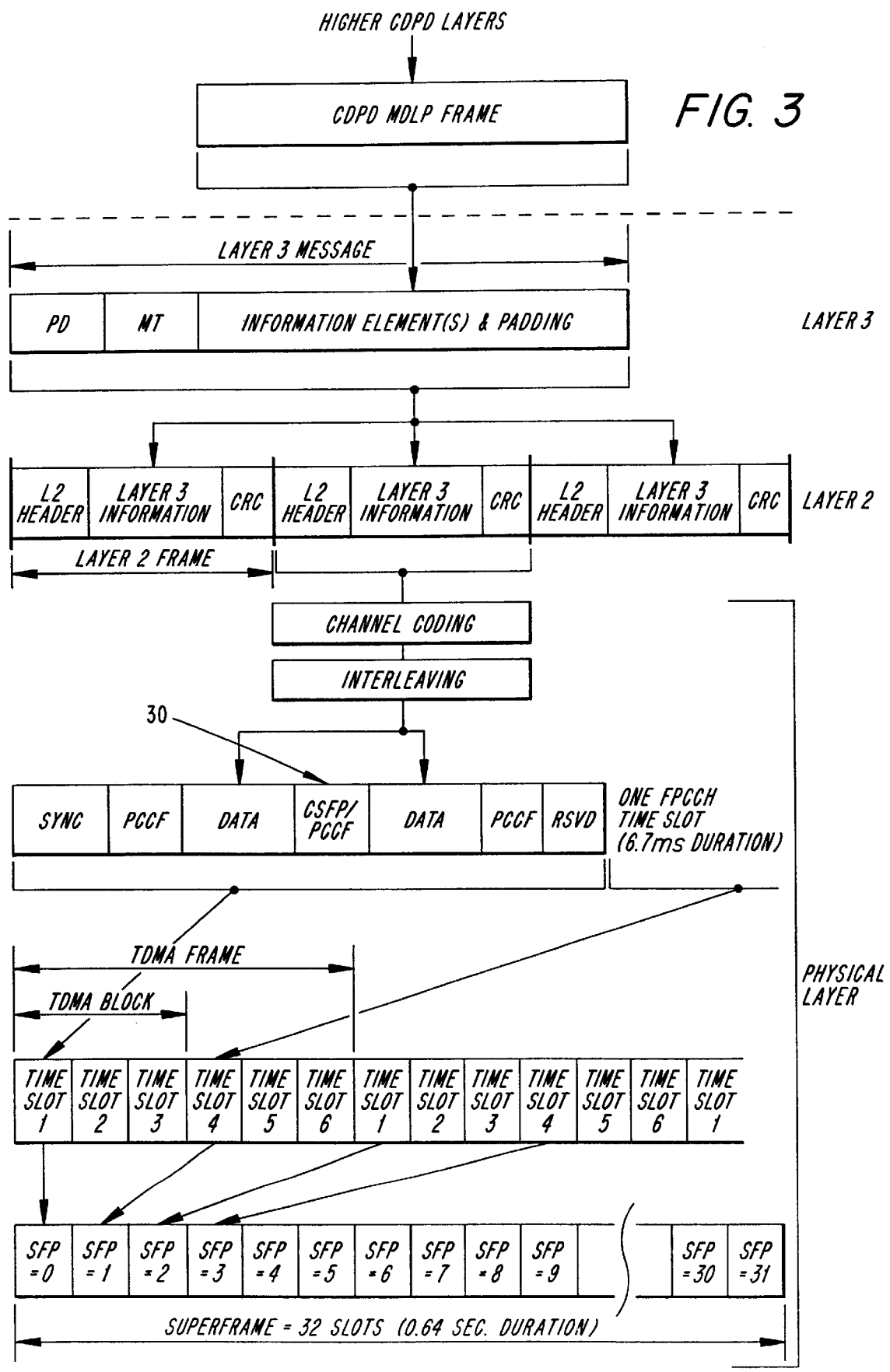
FIG. 3 illustrates one example of a possible mapping sequence between layers in a radiocommunication system.

FIG. 3 shows a dedicated PCCH example of how one layer 3 message is mapped into several layer 2 frames, an example of a layer 2 frame mapping onto a time slot, and an example of a time slot mapping onto a PCCH channel. The length of the FPCCH time slots and the PRACH bursts are fixed. There are three possible forms of PRACH bursts (normal, abbreviated, and auxiliary) which have different fixed lengths. FPCCH slots on a full-rate PCCH are assumed to be on the physical layer in FIG. 3.

Figure 1:
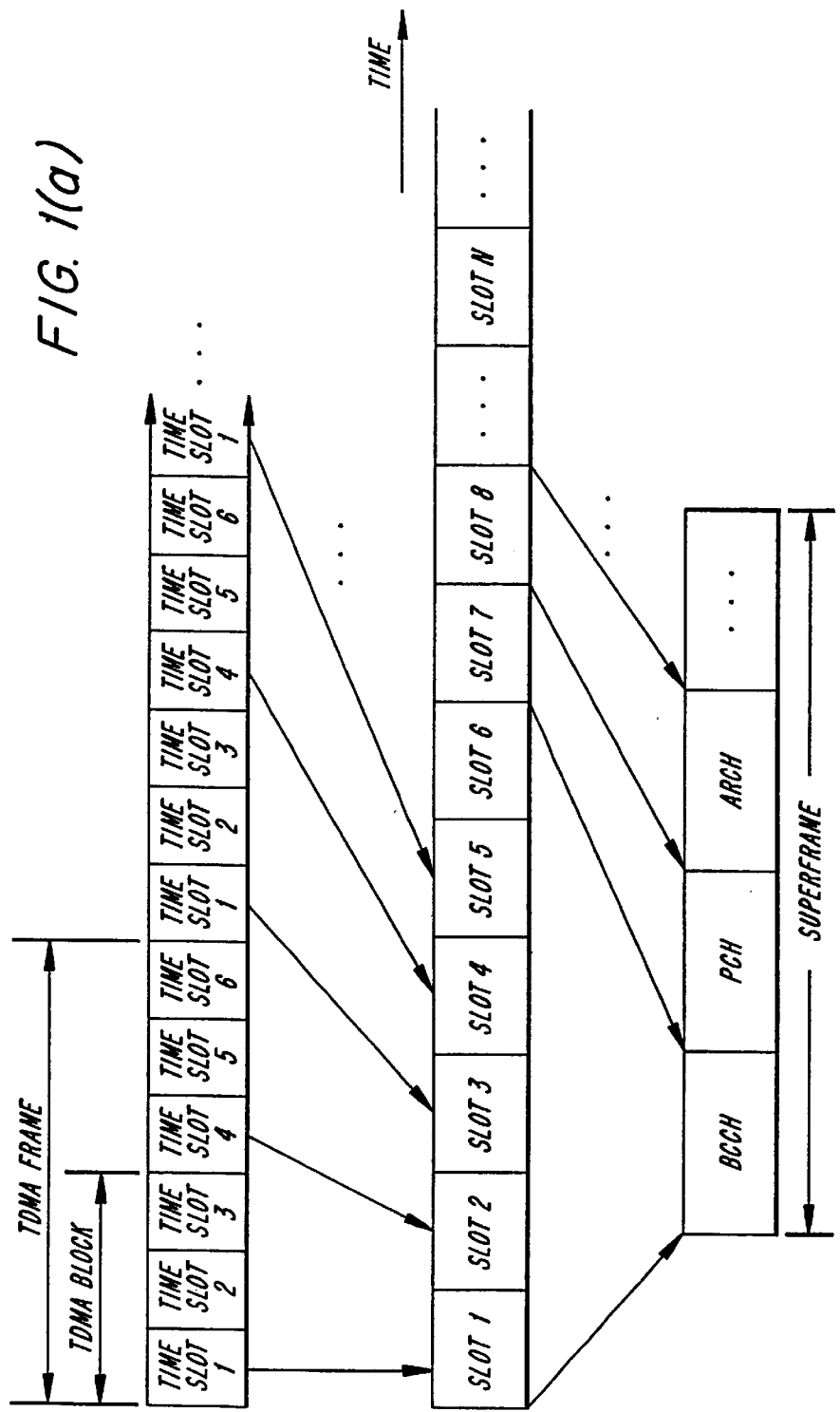
FIG. 1(a) shows a forward DCCH configured as a succession of time slots included in the consecutive time slots sent on a carrier frequency.
FIG. 1(b) shows an example of an IS-136 DCCH field slot format.

Note that in FIG. 3 the slot format 30 is slightly different than that of FIG. 1(a). In this embodiment, the slot format is divided into seven fields; a synchronization field (SYNC) for providing synchronization information to the mobile station, a packet control channel feedback field (PCCF), a first data (DATA) field, a coded superframe phase/packet control channel feedback (CSFP/PCCF) field, a second data field, a second packet control channel feedback (PCCF) field, and a reserved (RSVD) field. Thus, it can be seen that the SCF field of IS-136 has been supplanted by the PCCF field for packet data communications while maintaining the same bit sizes in the field structure.

The PCCF field is used to control accesses on the PRACH and is comprised of several flags: Received/Not Received (R/N); Partial Echo (PE); Partial Echo Qualifier (PEQ). Note, however, that according to the present invention the packet control channel feedback field does not contain a Busy/Reserved/Idle (BRI) flag as in the above-identified parent application. The R/N flag is used to convey the received/not received status of individual bits sent to the base station on the PRACH. The partial echo flag is used to indicate which mobile station attempting a contention based access has had its initial burst correctly received by the communication system. For this purpose, the communication system can set PE equal to the seven least significant bits of the mobile station identity sent as part of the mobile station access attempt. The partial echo flag is also used to solicit or poll a response from a mobile station while it is in the process of receiving an automatic retransmission request mode transmission. For this purpose, the communication system can set PE equal to the PE assigned (PEA) to the mobile station in the first slot sent to the mobile station within the context of a given automatic retransmission request (ARQ) mode transmission. The partial echo flag is also used to indicate when a mobile station attempting a non-ARQ related reservation based access, should start its message transmission. For this purpose, the communication system sets PE equal to the 7 least significant bits of the mobile station identity for which the communication system wishes to provide a reservation-based access opportunity.

The PEQ flag is used by the communication system to, among other functions described below, dynamically assign the sub-channels of the PRACH so as to provide an efficient mechanism for interrupting the packet data transmission of a first mobile station and thereby allow for packet data transmission from other mobile stations that are either attempting to access the system or have already accessed the system and are in the process of sending packet data information. For example, if a full rate TDMA channel is logically divided into three subchannels, then a total of nine subchannels are available for multiplexing among packet data users in a triple rate IS-136 style packet data system.

According to one exemplary embodiment of the present invention, the CSFP/PCCF field depicted in slot format 30 of FIG. 3 is used to convey information regarding the superframe phase (so that the mobile stations can find the start of the superframe) and to provide the partial echo qualifier information. In this embodiment, the CSFP/PCCF field contains 12-bits (D0–D11).

The PEQ flag can be assigned two bits within the 12-bit CSFP/PCCF field. For example, the PEQ flag can be assigned bits D6 and D5, however the present invention is not limited thereto. Exemplary encoding rules for the PEQ flag will now be described and are illustrated in Table 1. When the bits D6 and D5 are set to zero, no interrupt is indicated and each mobile station maintains its current subchannel ownership. When bits D6 and D5 are set to zero and one, respectively, sub-channel ownership is assigned to the mobile station identified in the coded partial echo (CPE) field. When the bits D6 and D5 are set to one and zero, respectively, the sub-channel ownership is suspended to service contention-based access attempts. Note that a subchannel owner must have already sent two or more bursts in order to consider these PEQ flag settings as an indication of suspended ownership. Finally, when both of the bits D6 and D5 are set to one, sub-channel ownership must be verified whereupon each mobile station owning a subchannel examines the CPE field to ensure that it is owner of that subchannel. It will be appreciated by one skilled in the art that other bit pairs may be used and that this invention is not limited to the bit pair (D6 and D5) described above.

TABLE 1

PEQ ENCODING RULES

| Subchannel Assignment and PE Association | PEQ | D6 | D5 |
|---|---|---|---|
| No Interrupt. Current subchannel ownership is maintained. | NO_INT | 0 | 0 |
| Partial Echo Interrupt. Ownership of subchannel is assigned to the mobile station identified by the CPE field. | PE_INT | 0 | 1 |
| Suspended Ownership Interrupt. Current subchannel ownership is suspended to service contention-based access attempts. | SO_INT | 1 | 0 |
| Warning Interrupt. Current subchannel owner to re-examine the CPE field to verify its subchannel ownership. | WA-INT | 1 | 1 |

The PCCF flags are carried in FPCCH time slots and serve to, among other functions, indicate the communication system's reception status of bursts previously transmitted on the RPCCH (i.e., PRACH). A mobile station having a reservation-based access or a contention-based access pending reads the PCCF flags to determine when to begin its access attempt. Reservation-based and contention-based access are described in detail in the above-identified parent application, which discussion is not repeated here for clarity of this disclosure.

According to exemplary embodiments of the present invention, the PCCF field described above supports both contention-based and reservation-based access in a manner which (1) efficiently handles single burst access attempts, (2) optimizes bit space in the PCCF field, (3) reliably handles subchannel transitioning and (4) supports dynamic allocation of contention-based access opportunities.

For example, in the parent application, PEQ=INT_1 (used in response to the first burst of an access attempt) indicates to a mobile station finding this PEQ value in its corresponding PCCF field, that it has lost subchannel ownership until further notice. In this case, subchannel ownership reverts to the mobile station owning the subchannel immediately preceding the subchannel for which PEQ=INT_1. While this type of functionality may be appropriate under certain circumstances, Applicants have instead provided the above-described NO_INT, PE_INT and SO_INT values for PEQ which provides for greater flexibility in reassignment of subchannel ownership after receiving the first burst of an access attempt.

In the parent application, the BRI field was used to indicate whether the PRACH was busy, reserved or idle. By noting that BRI=Idle is logically the same as PEQ=SO_INT and that PEQ=NO_INT, PE_INT covers the cases of BRI=Busy, Reserved, respectively, Applicants recognized that the BRI field could be dispensed with, thereby providing additional bit space in the PCCF field for other functionality.

Transitions in subchannel ownership create potential vulnerability when, for example, the current subchannel owner does not correctly detect an intended transition in ownership (e.g., a PE_INT may be missed by the current owner of a subchannel as a result of PEQ reception errors). Ease in subchannel transitioning is enhanced using the above-described exemplary PEQ encoding rules. For example, the WA_INT value of PEQ described above allows for mobile stations to detect missed transitions in subchannel ownership.

For example, a base station can reassign subchannel ownership from one mobile station to another using the PE_INT value of PEQ. Then, if the original owner misinterprets or otherwise fails to relinquish subchannel ownership, the base station can transmit PEQ=WA_INT in the next instance of PCCF for that subchannel, which provides a second chance for the mobile station to review the CPE field and relinquish subchannel ownership. Thus, if a mobile station unexpectedly receives a PEQ value of WA_INT (i.e., one which does not immediately follow a PE_INT) on a subchannel which it believes that it owns, that mobile station will realize that it missed a subchannel ownership transition. Then, that mobile station will relinquish subchannel ownership and consider that its last transmitted burst needs to be retransmitted.

In addition to cases of incorrectly retained subchannel ownership, the exemplary PEQ encoding rules described above are also beneficially formulated for handling the reverse situation, i.e., where another mobile station incorrectly assumes subchannel ownership from a legitimate owner. This situation, referred to as "subchannel hijacking", is dealt with in more detail below.

Initial access to the radiocommunication system may be performed using contention-based access methodologies such as Slotted ALOHA and/or Carrier Sense Multiple Access (CSMA), which techniques are, per se, well known in the packet data art. It should be noted that a mobile station looking for a PEQ=SO_INT condition is inherent to the CSMA form of system access whereby a mobile station first receives information (e.g., PEQ) from a communication system before deciding when to make an access attempt. Both contention and reservation based accesses are supported within the scope of CSMA operation. For slotted ALOHA access a mobile station does not wait to receive any information from a communication system before deciding when to make an access attempt. Only contention based accesses are supported within the scope of Slotted ALOHA operation. Both CSMA and Slotted ALOHA may be supported simultaneously on a PCCH, thus allowing even greater operational flexibility for a serving system. Mobile stations looking for an access opportunity may use whichever type of access slot they first encounter—e.g., CSMA or Slotted ALOHA.

For example, system broadcast information, (e.g., on the PBCCH) can be used to inform mobile stations about Slotted ALOHA-based access opportunities (i.e., that they exist), which opportunities can be fixed in position by the BCCH information. Then, the system can set PEQ=PE_INT and CPE=to a currently inactive PE value, to ensure that active mobile stations do not use a slotted ALOHA access opportunity. The selection of an inactive PE can be made using a PE value that is, from a coding perspective, most distant from active PEs. This minimizes the chance of another, active mobile station misreading the CPE and assuming subchannel ownership for a slot earmarked for a Slotted ALOHA access opportunity. Mobile stations can be informed of CSMA-based access opportunities by setting PEQ=SO_INT, which opportunities can be provided on a real time basis by the system.

Of course, those skilled in the art will appreciate that the PEQ described in the above-identified parent application could also be used to provide CSMA and Slotted ALOHA access as follows. CSMA access opportunities could be conveyed to the mobile stations by setting BRI=Idle and either PEQ=RSVD or PEQ=INT_2 and CPE=to an inactive PE. Slotted ALOHA access opportunities could be supported using this earlier PEQ encoding scheme using broadcast information and setting BRI=Reserved, PEQ=INT_2 and CPE=to an inactive PE.

In either case, mobile stations that have already made a successful initial access (i.e. have sent the first burst of their packet data transaction) will ignore uplink slots earmarked as CSMA or Slotted ALOHA access opportunities. Once a mobile station has successfully made an initial access and the PCCH decides to manage the packet data transaction locally (i.e. on the PCCH itself as opposed to delegating the transaction to a packet traffic channel), the PCCF scheme supports the multiplexing of PCCH uplink bandwidth among multiple system users.

Having described an exemplary PEQ encoding scheme according to the present invention, as well as some of the features thereof, the following description provides additional detail regarding mobile station response to the feedback information conveyed by the PCCF. Initially, access attempts made by mobile station using Slotted ALOHA differ from those made using CSMA according to the present invention in that Slotted ALOHA access attempts do not require the mobile stations to monitor the PCCF, whereas mobile stations desiring CSMA access monitor the PEQ field of the PCCF to identify access opportunities, as seen in Table 2.

TABLE 2

Fields Monitored Prior to Access Attempts

| Downlink Field | Slotted ALOHA | CSMA |
|---|---|---|
| CPE | No | No |
| R/N | No | No |
| PEQ | No | Yes |

Once a mobile station has accessed a radiocommunication system using one of these two contention-based access schemes, the mobile station will monitor the PCCF fields for feedback as illustrated in the following tables. For feedback after the first burst is sent, the mobile station monitors the fields as shown in Table 3.

TABLE 3

Feedback Fields Examined After Sending First Burst

| Downlink Field | Slotted ALOHA | CSMA |
|---|---|---|
| CPE | Yes (Note 1) | Yes (Note 1) |
| R/N | Yes | Yes |
| PEQ | Yes | Yes |

(Note 1) Only examined if R/N = Received

For subsequent bursts, the monitoring rules are the same for Slotted ALOHA and CSMA. Thus, Table 4 distinguishes between mobile stations which own a particular subchannel and those which do not own that subchannel.

TABLE 4

Feedback Fields Examined During Remainder of Transaction

| Downlink Field | Subchannel Not Owned | Subchannel Owned |
|---|---|---|
| CPE | Yes (Note 2) | Yes (Note 3) |
| R/N | No | Yes |
| PEQ | Yes | Yes |

(Note 2) Only examined if PEQ = PE_INT
(Note 3) Only examined if PEQ = PE_INT or WA_INT From Table 4, it can be seen that a mobile station which does not own a particular subchannel is not interested in whether a previous burst sent on that subchannel was received and is only interested in the value of the coded partial echo field if the subchannel ownership is being transferred, e.g., if PEQ=PE_INT. The owner of the subchannel, on the other hand, is always interested in whether its transmitted burst was received and will also look at the CPE field if directed to do so by the base station, i.e., when PEQ=WA_INT.

Having discussed which fields the mobile stations will monitor, the way in which these fields are processed by mobile stations will now be discussed with respect to the following Tables, wherein the notation "X" refers to a "don't care" value. For example, a mobile station having unqualified ownership of a subchannel (i.e., a mobile station maintains subchannel ownership after sending the first burst of its access) will respond to the feedback provided in the PCCF fields as shown in Table 5 below.

TABLE 5

MS Sends Payload Burst and Responds to Feedback

| R/N | CPE | PEQ | Mobile Station Response |
|---|---|---|---|
| N | X | NO_INT | Maintain subchannel ownership Current burst must be resent |
| N | Match | PE_INT | Maintain subchannel ownership Current burst must be resent |
| N | Mismatch | PE_INT | Suspend subchannel ownership Current burst must be resent |
| N | X | SO_INT | Suspend subchannel ownership for next uplink slot of subchannel Current burst must be resent |
| N | Match | WA_INT | Maintain subchannel ownership Current burst must be resent |
| N | Mismatch | WA_INT | Relinquish subchannel ownership Current burst must be resent |
| R | X | NO_INT | Maintain subchannel ownership Current burst successfully sent |
| R | Match | PE_INT | Maintain subchannel ownership Current burst successfully sent |
| R | Mismatch | PE_INT | Suspend subchannel ownership Current burst succesfully sent |
| R | X | SO_INT | Suspend subchannel ownership for next uplink slot of subchannel Current burst successfully sent |
| R | Match | WA_INT | Maintain subchannel ownership Current burst successfully sent |
| R | Mismatch | WA_INT | Relinquish subchannel ownership Current burst must be resent |

As can be seen from Table 5, the value of R/N dictates whether the last burst must be resent. Whenever R/N=N, the last burst must be resent. Normally, when R/N=R, the last burst need not be resent, except in the case of CPE=Mismatch and PEQ=WA_INT, which indicates that the mobile station missed a subchannel transition (i.e., PEQ=PE_INT) as described above. The PEQ values of NO_INT, PE_INT and SO_INT provide for maintaining and suspending subchannel ownership as described in Table 1 above. When PEQ=WA_INT, the mobile station rechecks CPE and either maintains or relinquishes subchannel ownership based upon a result of this comparison, which PEQ value is used by the system to rid the subchannel of illegitimate owners.

Some mobile stations, which may or may not already own one or more subchannels, will have sent at least a first burst of an access attempt and be looking to acquire ownership of a subchannel. These "sniffing" mobile stations will monitor the PCCF to determine whether they can acquire ownership as illustrated in table 6.

TABLE 6

Sniffing MS Responds to Feedback for Payload Burst

| R/N | CPE | PEQ | Mobile Station Response |
|---|---|---|---|
| X | X | NO_INT | Ignore subchannel |
| X | Match | PE_INT | Assume subchannel ownership |
| X | Mismatch | PE_INT | Ignore subchannel |
| X | X | SO_INT | Ignore subchannel |
| X | x | WA_INT | Ignore subchannel |

As seen from this table, the sniffing mobile station can only acquire ownership of a subchannel if the base station reassigns the subchannel to the CPE value reflecting the identity of the sniffing mobile station.

Mobile stations seeking to make an initial access (i.e., that have not yet sent their first burst) and thereby acquire subchannel ownership, may attempt to access the system using a CSMA access opportunity indicated when PEQ=SO_INT. Upon detecting PE=SO_INT, these mobile stations send their first burst and respond to PCCF feedback as shown in Table 7.

TABLE 7

MS Sends SO_INT Burst and Responds to Feedback

| R/N | CPE | PEQ | Mobile Station Response |
|---|---|---|---|
| N | X | X | Relinquish subchannel ownership Access re-attempted according to retry mechanism |
| R | Mismatch | X | Relinquish subchannel ownership Access re-attempted according to retry mechanism |
| R | Match | NO_INT | Relinquish subchannel ownership First burst of access successfully sent |
| R | Match | PE_INT | Assume subchannel ownership First burst of access successfully sent |
| R | Match | SO_INT | Relinquish subchannel ownership First burst of access successfully sent |
| R | Match | WA_INT | Relinquish subchannel ownership First burst of access successfully sent |

According to Table 7, if the burst is not received, then the mobile station relinquishes subchannel ownership and re-attempts access using a retry mechanism, e.g., that described in the parent application. Similarly, if the mobile station is not the winner of the contention-based access (i.e., CPE=Mismatch), then the mobile station must also relinquish ownership and retry its access. Otherwise, if the burst was correctly received, CPE=Match and PEQ is not equal to PE_INT, then the first burst sent by the interrupting mobile station was successfully received, but the winning/interrupting mobile station must relinquish the subchannel. For these cases, the winning/interrupting mobile then becomes a "sniffing" mobile and follows the rules outlined in Table 6. If, on the other hand, the burst was correctly received, CPE=Match and PEQ=PE_INT, then the winning/interrupting mobile station assumes ownership of the subchannel (i.e., unqualified ownership) and follows the rules outline in Table 5.

When a mobile station is interrupted by way of receiving the feedback PEQ=SO_INT, it continues to monitor the PCCF on its previously owned subchannel as shown in Table 8.

TABLE 8

Interrupted MS Responds to Feedback for SO_INT Burst

| R/N | CPE | PEQ | Mobile Station Response |
|---|---|---|---|
| X | X | NO_INT | Resume subchannel ownership |
| X | Match | PE_INT | Reserve subchannel ownership |
| X | Mismatch | PE_INT | Relinquish subchannel ownership |
| X | X | SO_INT | Suspend subchannel ownership for next uplink slot of subchannel |
| X | X | WA_INT | Relinquish subchannel ownership |

Therein, if the mobile station receives PEQ=PE_INT and CPE=Mismatch or WA_INT, then it relinquishes ownership of the channel and awaits a new subchannel per the rules of Table 6. If PEQ=NO_INT or PEQ=PE_INT and CPE=Match, then the original owner resumes subchannel ownership and continues transmitting bursts and processing feedback pursuant to Table 5. When the interrupted mobile station identifies PEQ=SO_INT, then another mobile station is being given a CSMA access opportunity and the interrupted mobile station continues to monitor this subchannel for yet another time slot in accordance with Table 8.

"Sniffing" mobile stations, i.e., those which have successfully sent at least one burst and are looking for ownership of a subchannel, do not respond to feedback associated with subchannels which are being used by interrupting mobiles. Thus, the response table for these sniffing mobile stations is shown below as Table 9.

TABLE 9

Sniffing MS Responds to Feedback for SO_INT Burst

| R/N | CPE | PEQ | Mobile Station Response |
|---|---|---|---|
| X | X | NO_INT | Ignore subchannel |
| X | X | PE_INT | Ignore subchannel |
| X | X | SO_INT | Ignore subchannel |
| X | X | WA_INT | Ignore subchannel |

A mobile station may also acquire access to a subchannel in response to a PEQ=PE_INT and CPE match within the PCCF. Such a mobile station will transmit a burst of information and respond to feedback as shown in Table 10.

TABLE 10

MS Sends PE_INT Burst and Responds to Feedback

| R/N | CPE | PEQ | Mobile Station Response |
|---|---|---|---|
| N | X | X | Relinquish subchannel ownership Access must be re-attempted according to retry mechanism (if first burst sent) or current burst must be resent (if not first burst). |
| R | Mismatch | X | Relinquish subchannel ownership Current burst of access successfully sent |
| R | Match | NO_INT | Relinquish subchannel ownership Current burst of access successfully sent |
| R | Match | PE_INT | Assume subchannel ownership Current burst of access successfully sent |
| R | Match | SO_INT | Relinquish subchannel ownership Current burst of access successfully sent |
| R | Match | WA_INT | Assume subchannel ownership Current burst of access successfully sent |

It will be seen that the response rules for a mobile station transmitting on a subchannel acquired via PEQ=PE_INT are almost the same as those in Table 7 above for a mobile station which acquires a subchannel via PEQ=SO_INT, except that the mobile station assumes channel ownership in response to PEQ=WA_INT when R/N=R and CPE=Match. When a mobile station is interrupted by way of receiving the feedback PEQ=PE_INT, that mobile station continues to monitor the PCCF associated with its previously used subchannel as shown in Table 11.

TABLE 11

Interrupted MS Responds to Feedback for PE_INT Burst

| R/N | CPE | PEQ | Mobile Station Response |
|---|---|---|---|
| X | X | NO_INT | Resume subchannel ownership |
| X | Match | PE_INT | Resume subchannel ownership |
| X | Mismatch | PE_INT | Relinquish subchannel ownership |
| X | X | SO_INT | Suspend subchannel ownership for next uplink slot of subchannel |
| X | X | WA_INT | Relinquish subchannel ownership |

Again, in a manner similar to Table 9, sniffing mobile stations will not acquire ownership of a subchannel whose ownership was transferred in the previous burst's PCCF feedback information, regardless of the various PCCF values as shown in Table 12.

TABLE 12

Sniffing MS Responds to Feedback for PE_INT Burst

| R/N | CPE | PEQ | Mobile Station Response |
|---|---|---|---|
| X | X | NO_INT | Ignore subchannel |
| X | X | PE_INT | Ignore subchannel |
| X | X | SO_INT | Ignore subchannel |
| X | X | WA_INT | Ignore subchannel |

As mentioned earlier, packet data transmissions according to exemplary embodiments of the present invention also provide robustness in the area of handling subchannel hijacking, which phrase refers to the unintended transfer of subchannel ownership from one mobile station to another. According to the present invention, each Medium Access Control (MAC) layer frame transmitted by a mobile station on the uplink can implicitly include the mobile station identification (MSID) when the cyclic redundancy check (CRC) calculation is performed. This allows base stations to easily detect the case of a hijacked subchannel since the received CRC will be incorrect due to inclusion of an unknown MSID in the CRC calculation. When this condition is detected the base station can recover by doing the following in the downlink slot providing PCCF feedback to the hijacked slot:

Set R/N=Not Received
Set PEQ=PE_INT
Set CPE=Intended MSID

By responding as described above, the hijacking mobile station will immediately relinquish subchannel ownership and the intended mobile station will reconfirm its ownership of the subchannel. Both mobile stations will realize that their last MAC layer frames must be resent.

To illustrate the effectiveness of the present invention in handling subchannel hijacking, several hijacking scenarios are considered under the following conditions:

Mobile Station 1 (MS1) owns subchannel 1.
Mobile Station 2 (MS2) is awaiting assignment of a subchannel.
Base station transmits PEQ=NO_INT.
Base station also transmits CPE=MS1.

Case #1—Triple Errors in Field Reception
Consider the occurrence of the following events.
1. MS1 incorrectly receives PEQ as SO_INT and gives up subchannel 1.
2. MS2 receives PEQ as PE_INT and CPE as MS2 and therefore assumes subchannel ownership.
3. Base station receives a MAC layer frame from MS2 and, because of the incorrect CRC, detects a potential hijack condition.
4. In the downlink feedback (PCCF) corresponding to the hijacked slot of subchannel 1, the base station sets R/N=Not Received, PEQ=PE_INT and CPE=MSID of MS1.
5. MS2 relinquishes subchannel 1 and MS1 reconfirms its ownership thereof.
6. MS2 realizes that the last MAC layer frame sent on subchannel 1 was incorrectly received and must be resent.

Case #2—Double Errors in Field Reception
1. MS1 receives PEQ as NO_INT and maintains ownership of subchannel 1.
2. MS2 receives PEQ as PE_INT and CPE as MS2 and assumes ownership of subchannel 1.

3. Without the capture effect, the base station starts to receive unintelligible information and because of incorrect CRC detects a potential hijack condition. Note that the "capture effect" refers to the situation where two mobile stations send at the same time and one of these signals is received more strongly than the other to the point where the base station can still correctly receive the stronger mobile station's signal.

4. In the downlink feedback corresponding to the hijacked slot of subchannel 1 the base station sets R/N=Not Received, PEQ=PE INT and CPE=MSID of MS1.

5. MS2 relinquishes subchannel 1 and MS1 reconfirms its ownership thereof.

6. MS1 realizes that the last MAC layer frame it sent on subchannel 1 was incorrectly received and must be resent.

7. MS2 realizes that the last MAC layer frame it sent on subchannel 1 was incorrectly received and must be resent.

Case #3—Double Errors in Field Reception

1. MS1 receives PEQ as NO_INT and maintains ownership of subchannel 1.

2. MS2 receives PEQ as PE_INT and CPE as MS2 and assumes subchannel ownership.

3. With capture effect the base station receives a MAC layer frame from MS2 but because of incorrect CRC detects a potential hijack condition.

4. In the downlink feedback corresponding to the hijacked slot of subchannel 1 the base station sets R/N=Not Received, PEQ=PE_INT and CPE=MSID of MS1.

5. MS2 relinquishes subchannel 1 and MS1 reconfirms its ownership thereof.

6. MS1 realizes that the last MAC layer frame it sent on subchannel 1 was incorrectly received and must be resent.

7. MS2 realizes that the last MAC layer frame it sent on subchannel 1 was incorrectly received and must be resent.

Having explained the operation of packet data communication systems and methods according to the present invention in some detail, some general access examples are provided below with respect to FIGS. 4–9.

Figure 4:
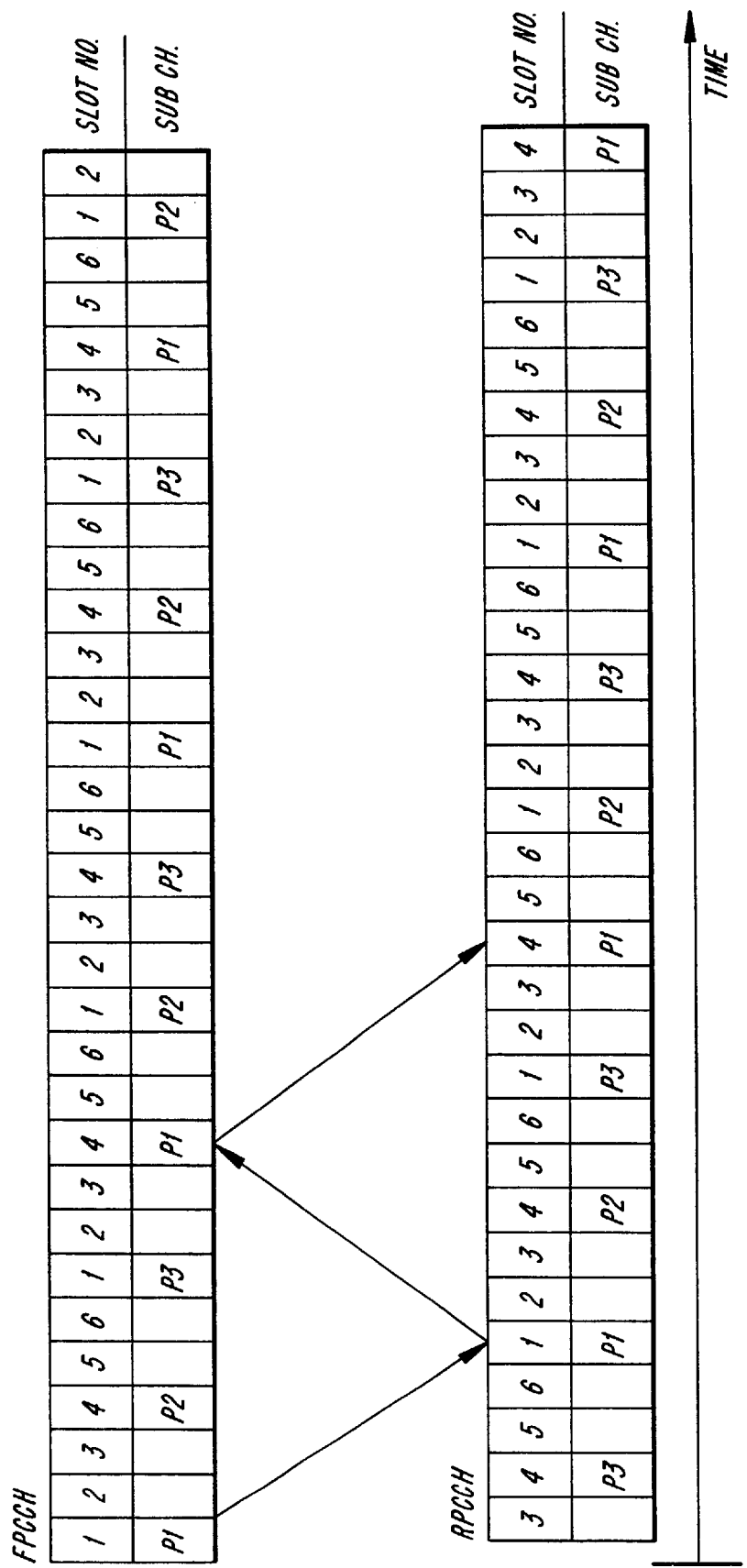
FIG. 4 illustrates the PRACH subchannels that are used in a full-rate PCCH.

In a full-rate PCCH, the PRACH bursts and the FPCCH slots are multiplexed so as to create three distinct access paths as illustrated in FIG. 4. Assuming that path 1 (P1) in the FPCCH indicates that the next P1 burst in the PRACH is available, e.g., PEQ=SO_INT, and is selected for an access attempt, a mobile station sends the first burst of its access at that time (after receiving the full P1 slot in the FPCCH). The mobile station then begins reading the PCCF flags in the next P1 FPCCH slot after completing transmission of its access burst to determine whether or not the communication system received the mobile station's initial burst.

Figure 5:
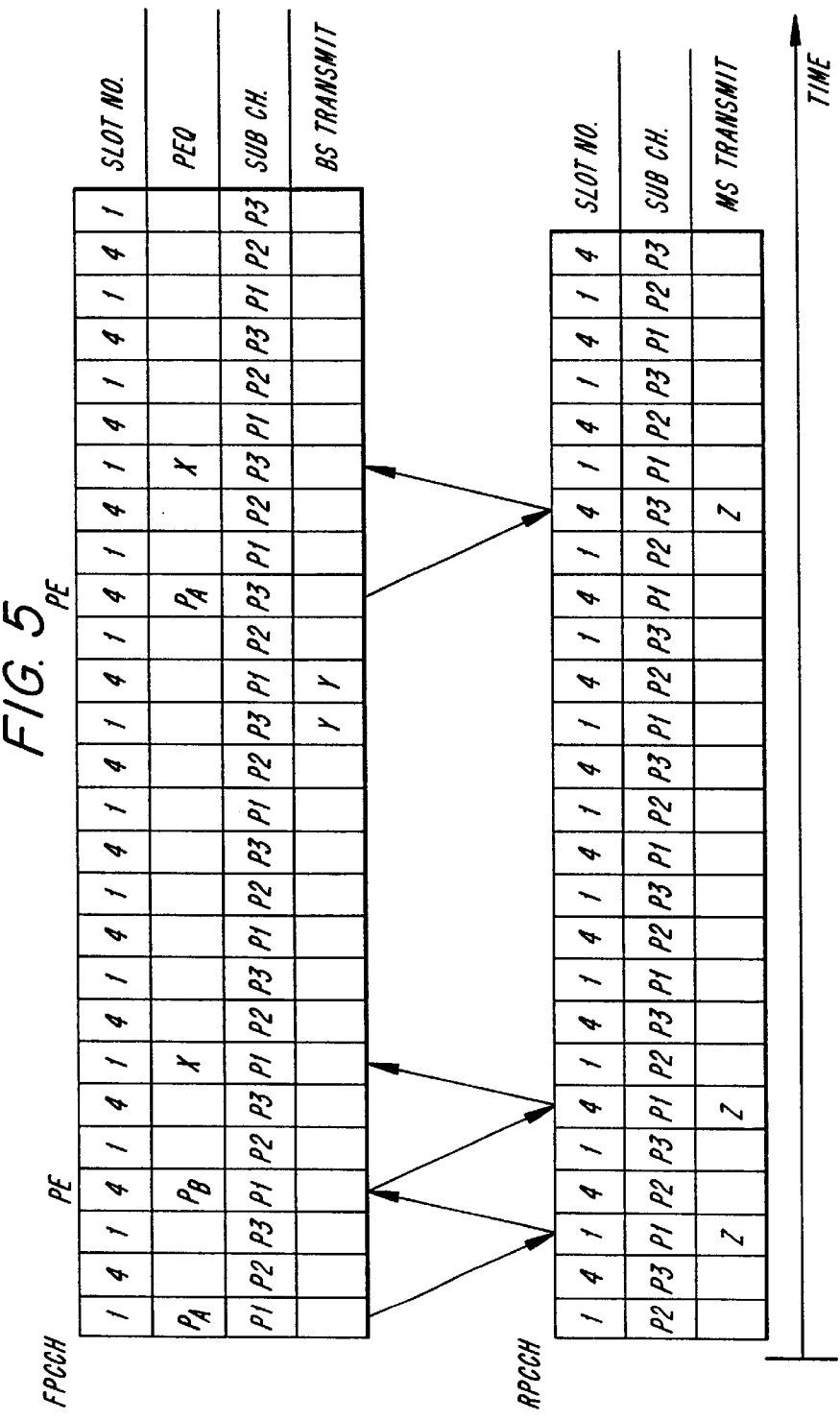
FIG. 5 illustrates an example of a dialogue between a mobile station and a communication system.

FIG. 5 illustrates the relationship between FPCCH PCCF flags and PRACH (RPCCH) bursts, wherein a mobile station makes a contention-based access and transmits a total of two bursts. The arrows show the order or events associated with the access attempt. Thus, following the arrows from left to right on PRACH sub-channel P1, the PEQ portion of the PCCF flag first indicates the availability of the next P1 burst in the PRACH. If a burst is transmitted in the PRACH burst, then the mobile station reads the R/N portion of the PCCF flags in the next P1 FPCCH slot to determine whether the communication system successfully received the mobile station's transmitted burst. For the first burst of a random access, the mobile station also reads the CPE portion of the PCCF flags to determine whether or not the mobile station's particular access was captured. The communication system sets the value of the CPE flag to reflect the captured mobile station access, for example, the value of the CPE flag can be set to reflect the least significant bits of the mobile station's identification. If the mobile station determines that it's access was captured based on the CPE flag and the R/N flag indicates that the burst was received, the mobile station examines PEQ to determine if it may proceed with its access using the current subchannel. If PEQ=PE_INT, the mobile station proceeds to send any additional bursts it has pending beginning with the next P1 burst in the PRACH.

As set forth above, the PCCF flags provide information to a mobile station regarding when the mobile station is allowed to transmit, when the mobile station is requested to transmit, the communication status of a previously transmitted burst, and partial echo association. Since the PCCH channel may be a multi-rate channel (full-rate, double-rate, and triple-rate), many mobile stations may be operating on the channel using different rates. The PCCF operation is the same for all mobile transmission rates. Thus, the multi-rate PCCH is not partitioned into dedicated bandwidth for full-rate, double rate, and triple rate transmissions.

Figure 6:
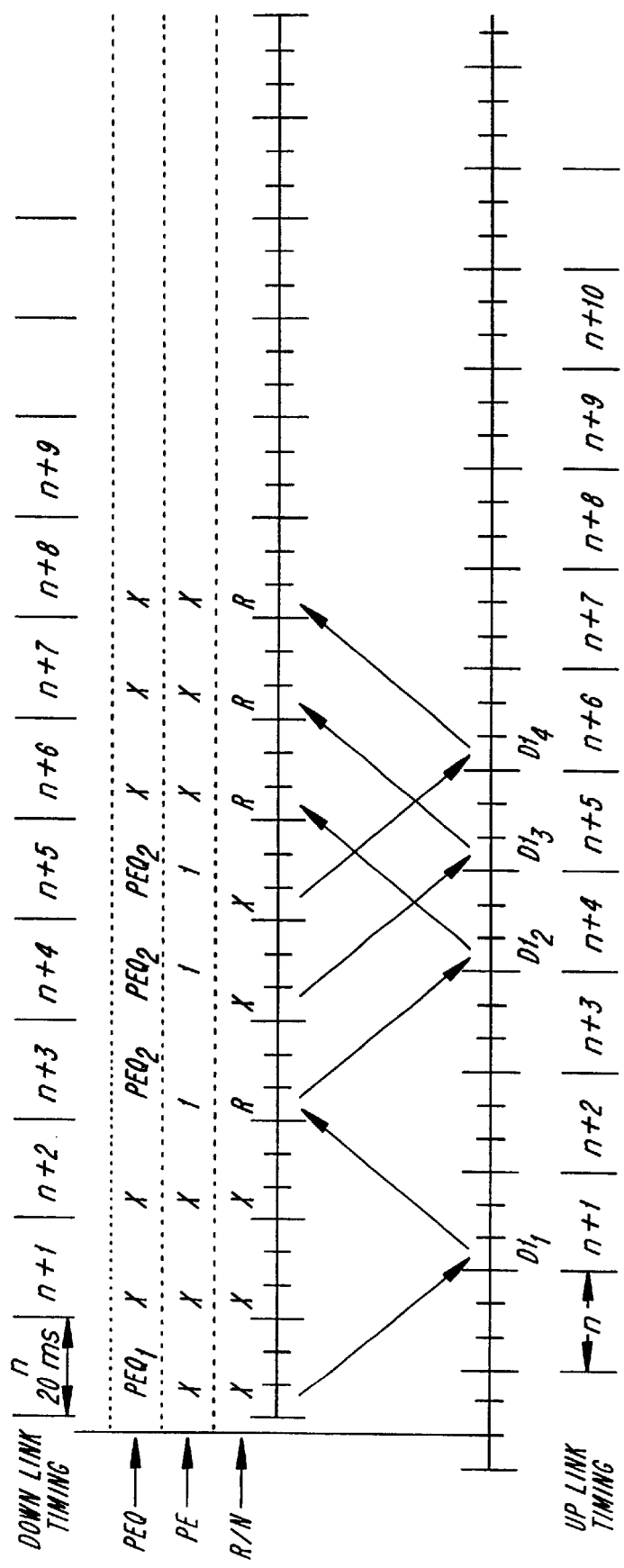
FIG. 6 illustrates one mobile station communication of a full-rate PCCH.
Figure 7:
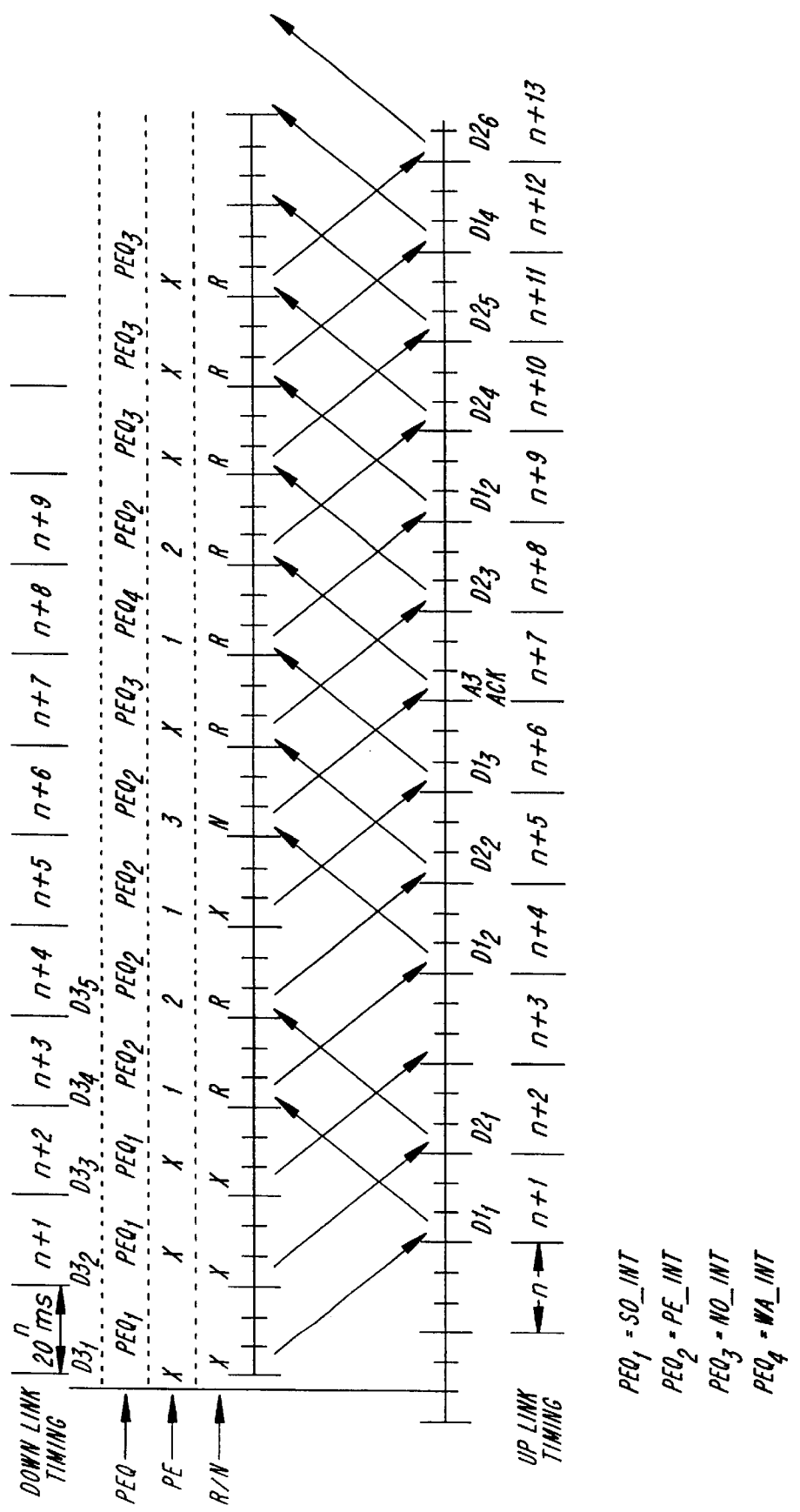
FIG. 7 illustrates three mobile stations communicating on a full-rate PCCH.
Figure 8:
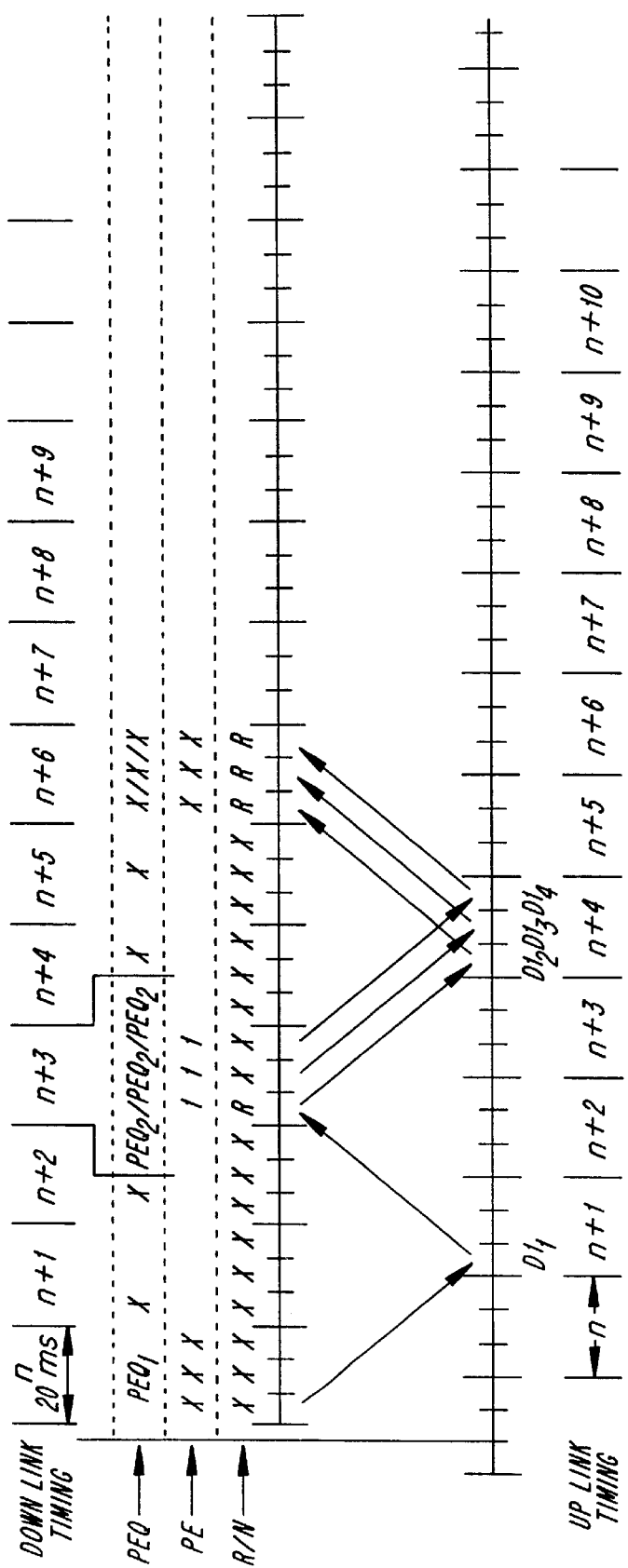
FIG. 8 illustrates one mobile station communicating on a triple-rate PCCH.

FIGS. 6–8 provide several graphical illustrations of the functionality of the PEQ flag. It will be apparent to one skilled in the art that these illustrations are examples of this invention and that this invention is not limited to just these illustrations. In FIGS. 6–8, a PEQ marker is used to illustrate the appropriate values for PEQ within a transaction. In the case where the first random access burst has been successfully received, the communication system indicates that R/N=Received. In addition, the communication system sets PEQ=PE_INT to indicate that the next uplink slot on the same access path (subchannel) is reserved for the mobile station to send the second burst.

FIG. 6 illustrates an example of one mobile station's communications on a full-rate PCCH. At down-link time n, the mobile station MS1 detects an idle condition wherein PEQ=SO_INT. At down-link time n+1, the base station sets the channel to idle and no mobile stations are in the process of acquiring the channel. At up-link time n+1, the mobile station MS1 sends its first burst $D1_1$. At down-link time n+2, the base station sets the channel to idle. At downlink time n+3, the base station having received the first burst $D1_1$ correctly, determines by a length indicator within the first burst that the complete data transfer comprises four bursts. As a result, the base station sets PEQ=PE_INT and the R/N=Received and the mobile station sends its next burst ($D1_2$) at uplink time n+4. The mobile station MS1 then begins examining (sniffing) the PCCF for all subchannels that the mobile station is capable of operating on and sends its remaining bursts $D1_3$ and $D1_4$ on slots for which PEQ=PE_INT and CPE=MS1. At down-link time n+6, the base station indicates that the burst $D1_2$ has been received. At down-link time n+7, the base station indicates at the burst $D1_3$ has been received. Finally, at down-link time n+8, the base station indicates that the burst $D1_4$ has been received. Thus, all four bursts have been successfully received by the base station.

FIG. 7 illustrates an example of three mobile stations communicating on a full-rate PCCH. At downlink time n, the base station sends a first burst $D3_1$ to a third mobile station, MS3. In addition, a first mobile station MS1 detects an idle (PEQ=SO_INT) condition, while at downlink time n+1, a second mobile station MS2 detects an idle condition.

Furthermore, at downlink time n+1, the base station sends a second burst $D3_2$ to the third mobile station MS3. At up-link time n+1, the first mobile station MS1 sends its first burst $D1_1$ to the base station. At downlink time n+2, the base station sends a third burst to the third mobile station MS3 and sets the channel to idle. At down-link time n+3, the base station sends a fourth burst to the third mobile station MS3. In addition, the base station having received the first burst correctly from MS1 determines by a length indicator within the burst that the complete transfer comprises four bursts. As a result, the base station responds by setting PEQ=PE_INT and R/N=Received. At up-link time n+2, the second mobile station MS2 sends its first burst $D2_1$. At downlink time n+4, the base station sends a fifth burst to the third mobile station MS3. In addition, the base station having received the first burst correctly from MS2 determines that the complete transfer comprises 6 bursts. As a result, the base station responds by setting PEQ=PE_INT and R/N=Received. At up-link times n+4, MS1 sends $D1_2$ and at uplink time n+5 MS2 sends $D2_2$. At down-link time n+5, the base station indicates PEQ=PE_INT and PE=MS1 allowing for $D1_3$ to be sent in uplink slot n+6. At down-link time n+6, the base station indicates that burst $D1_2$ was not received by setting R/N=Not Received. In addition, the base station reserves a slot by setting PEQ=PE_INT and PE=MS3 to allow MS3 to acknowledge the forward link transfer of bursts $D3_1$, $D3_2$, . . . $D3_5$. At down-link time n+7, the base station indicates that the burst $D2_2$ was received by setting the R/N=Received. In addition, the base station indicates the continued ownership of that subchannel by MS2 by setting PEQ=NO_INT. At downlink time n+1, the base station indicates that the burst $D1_3$ was received by setting the R/N=Received. In addition, the base station requests that MS1 confirm its subchannel ownership by setting PEQ=WA_INT. At up-link time n+7, the third mobile station MS3 sends a burst as a result of a reserved access request received during down-link time n+6. At down-link time n+9, the base station indicates the correct reception of the burst transmitted by the third mobile station MS3 by setting the R/N=Received. No PE match is required since this was a reserved access and not a random access. In addition, the base station indicates that the subchannel is reassigned to MS2 by setting PEQ=PE_INT and PB=MS2. At up-link time n+1, the second mobile station MS2 sends its burst $D2_3$. At up-link time n+1, the first mobile station resends its second burst $D1_2$. The second mobile station sends $D2_4$, $D2_5$ and $D2_6$ at uplink times n+10, n+11 and n+13, respectively. Finally, at uplink time n+12, the first mobile station MS1 sends $D1_4$.

FIG. 8 illustrates an example of one mobile station communicating on a triple rate PCCH. In this example, the base station creates an access opportunity by setting PEQ= SO_INT. At downlink time n, the mobile station MS1 detects an idle condition. At up-link time n+1, the mobile station MS1 sends its first burst $D1_1$. At downlink time n+3 for slot 1, the base station having received the first burst correctly determines, via a length indicator within the burst, that the complete transfer unit comprises four bursts. In response, the base station sets PEQ=PE_INT and R/N= Received for time slot 1. In time slots 2 and 3 in downlink time n+3, the base station also sets PEQ=PE_INT and PE=MS1 to assign two additional subchannels to MS1. At up-link time n+4, the mobile station MS1 sends its remaining bursts $D1_2$, $D1_3$, and $D1_4$. At down-link time n+6, in slots 1–3, the base station indicates the $D1_2$, $D1_3$, and $D1_4$ have been correctly received by setting the R/N=Received.

According to one embodiment of the present invention, a Packet Random Access Channel (PRACH) is divided into subchannels. Each subchannel adds delay between communications thus allowing sufficient processing time at both the mobile station and base station in conjunction with a random access event. As a result, the more subchannels the PRACH is divided into the longer the delay. For packet data it is very important for the transmissions to occur very fast. As a result, a full rate PCCH has been defined to consist of three PRACH subchannels, as opposed to six subchannels in a DCCH according to IS-136.

The PCCF flags are carried in FPCCH time slots and serve to indicate the reception status of bursts sent previously on the RPCCH. The PCCF flags are also used to indicate the availability status (i.e., PEQ) of their corresponding RPCCH bursts. A mobile station having an access pending reads PCCF flags to determine when to begin its access attempt.

Figure 9:
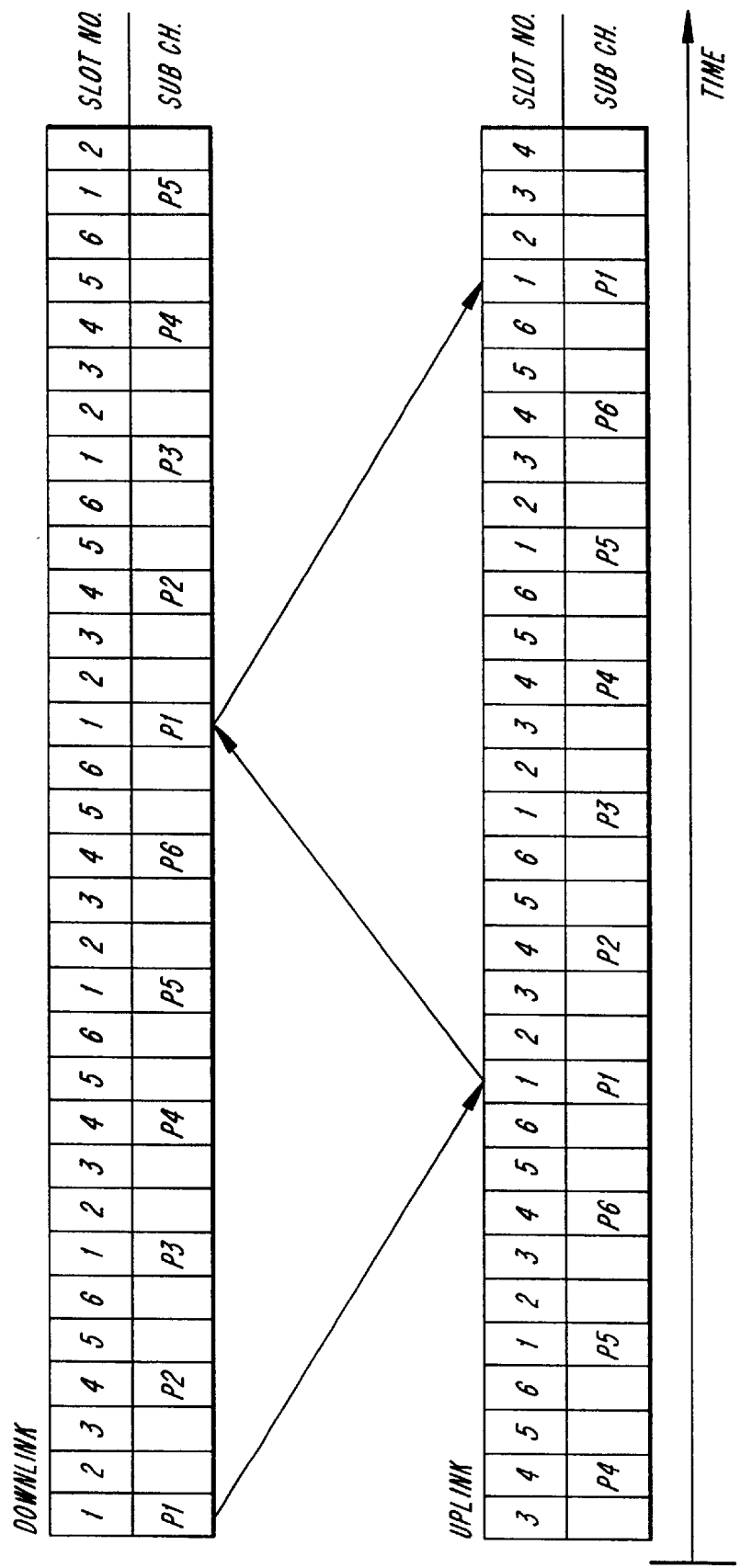
FIG. 9 illustrates the DCCH subchannels for full-rate DCCH according to IS-136.

If a full-rate PCCH exists then its RPCCH bursts and FPCCH slots are multiplexed so as to create 3 distinct access paths as shown in FIG. 4. Assuming that path 1 (P1) in the FPCCH indicates that the next P1 burst in the RPCCH is available (i.e., Idle) and is selected for an access attempt, a mobile station shall begin sending the first burst of its access at a fixed time (24.8 ms) after receiving the full P1 slot in the FPCCH. The mobile station shall then begin reading the PCCF flags in the next P1 FPCCH slot (21.8 ms) after completing transmission of its access burst to determine the reception status of its initial access burst at the base station. In contrast to FIG. 4, FIG. 9 illustrates the subchannels used by a full-rate DCCH according to IS-136. As is apparent from comparing FIGS. 10 and 15, it takes twice as long in IS-136 to transmit the 3 bursts (represented by the arrows). Similar advantages are also obtained for double- and triple-rate PCCH.

It should be noted that the PCCF information carried in any given FPCCH slot is completely independent of the layer 3 information carried therein as the PCCF flags occupy bandwidth completely separate from that assigned for PBCCH, PPCH, or PARCH purposes.

For purposes of completeness, a brief description of some of the elements of a radiocommunication system is now provided. FIG. 10 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCs, DTCs and PCCHs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

Thus, the present invention provides packet data operations which provide many benefits and advantages which will be readily apparent to those skilled in the art. For example, PEQ encoding schemes according to the present invention operate within the framework of existing IS-136 physical layer fields (i.e., no new fields are required and existing feedback functionality is maintained to a high degree). Moreover, the BRI field of the existing IS-136 physical layer is released for reassignment to other functionality as required.

Exemplary embodiments of the present invention also allow for a contention-based access scheme (e.g., Slotted ALOHA or CSMA) to operate concurrently with the multiplexing feature (reservation-based access) on the uplink of the same TDMA channel. Further, the present invention allows for equal application of delay to all packet data system users on the same TDMA channel independent of loading (i.e., equal throughput delay through multiplexing all users fairly).

The present inventions also provides mechanisms for base stations to quickly detect and efficiently recover from a suspected subchannel hijacking situation (i.e., efficient delivery of uplink packet data).

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

We claim:

1. A method for transmitting packet data information over a subchannel in a communication system comprising the steps of:
   granting access of the subchannel to a first communication device, such that said first communication device having unqualified subchannel ownership transmits a first burst of packet data on the subchannel;
   transmitting, by said communication system, first feedback information responsive to said first burst of packet data indicating that said first communication device's ownership of said subchannel is suspended; and
   granting access of the subchannel to a second communication device while said first communication device's ownership is suspended, such that said second communication device transmits a second burst of packet data information; and
   continuing to monitor, by said first communication device, said subchannel after being suspended.

2. The method of claim 1, further comprising the step of:
   transmitting, by said communication system, second feedback information responsive to said second burst of packet data information.

3. The method of claim 2, further comprising the step of:
   monitoring, by said first communication device, said second feedback information and resuming ownership of said subchannel if said second feedback information has a maintenance value.

4. The method of claim 3, wherein said second feedback information includes a partial echo qualifier field having said maintenance value equal to NO_INT or includes a partial echo qualifier field having said maintenance value equal to PE_INT and a CPE indicating the identity of said first communication device.

5. The method of claim 2, further comprising the step of:
   monitoring, by said second communication device, said second feedback information and relinquishing ownership of said subchannel if said second feedback information has a relinquishing value.

6. The method of claim 5, wherein said second feedback information includes a partial echo qualifier field having said relinquishing value equal to one of NO_INT, SO_INT and WA_INT.

7. The method of claim 2, further comprising the step of:
   monitoring, by said first communication device, said second feedback information and relinquishing ownership of said subchannel if said second feedback information has a verification value.

8. The method of claim 7, wherein said second feedback information includes a partial echo qualifier field having said verification value equal to one of WA_INT or PB_INT and a CPE not indicating the identity of said first communication device.

9. The method of claim 2, further comprising the step of:
   monitoring, by said second communication device, said second feedback information and assuming ownership of said subchannel if said second feedback information has a reassignment value.

10. The method of claim 9, wherein said second feedback information includes a partial echo qualifier field having said reassignment value equal to PE_INT.

11. The method of claim 2, further comprising the step of:
    monitoring, by said first communication device, said second feedback information and continuing to suspend ownership of said subchannel if said second feedback information has a suspension value.

12. The method of claim 11, wherein said second feedback information includes a partial echo qualifier field having said suspension value equal to SO_INT.

13. The method of claim 1, wherein said step of transmitting said first feedback information further comprises the step of:
    transmitting an interrupt message indicating that said first communication device's ownership of said subchannel is being suspended to provide a contention based carrier sense multiple access opportunity.

14. The method of claim 13, wherein said first feedback information includes a partial echo qualifier field having a suspension value equal to SO_INT.

15. A method for providing feedback in a packet data communication system comprising the steps of:
    transmitting a burst of packet data information on a subchannel from a communication device to said packet data communication system; and
    transmitting feedback information, responsive to said burst of packet data information, from said packet data communication system to said communication device, said feedback information including a partial echo qualifier field that includes:

(1) a third value indicating that said communication device's ownership of said subchannel is suspended and that said communication device continue monitoring said subchannel while being suspended; or (2) a fourth value indicating that said communication device is to verify its ownership of said subchannel.

16. The method of claim 15, wherein said first value is a NO_INT value.

17. The method of claim 15, wherein said second value is an PE_INT value.

18. The method of claim 15, wherein said third value is a SO_INT value.

19. The method of claim 15, wherein said fourth value is a WA_INT value.

20. The method of claim 15, wherein said subchannel comprises a logical division of a TDMA time slot.

21. The method of claim 15, wherein said second step of transmitting further comprises the step of:

including said third value in said partial echo qualifier field to provide a contention-based access opportunity for another communication device.

22. The method of claim 15, wherein said second step of transmitting further comprises the step of:

including said fourth value in said partial echo qualifier field when at least one communication device which has not been assigned to said subchannel is transmitting information in said subchannel.

23. The method of claim 15, wherein said partial echo qualifier includes a selective one of:

(1) a first value indicating that said communication device's ownership of said subchannel is maintained;

(2) a second value indicating that said communication device's ownership of said subchannel is reassigned to another communication device;

(3) said third value; and (4) said fourth value.

24. A method for transmitting packet data comprising the steps of:

receiving, at a base station, a burst of packet data on a subchannel;

performing a cyclic redundancy check (CRC) on said burst;

determining that a mobile station identity associated with said CRC is incorrect; and transmitting feedback information commanding that an unassigned mobile station relinquish ownership of said subchannel.

25. The method of claim 24, wherein said step of transmitting further comprises the steps of:

setting a received/not received field in said feedback information to not received;

setting a partial echo qualifier field in said feedback information to a value which indicates that said subchannel is to be reassigned; and setting a partial echo field in said feedback information to a value associated with an intended owner of said subchannel.

* * * * *